United States Patent [19]
Gudbjornsson

[11] Patent Number: 6,163,503
[45] Date of Patent: Dec. 19, 2000

[54] SYSTEM, APPARATUS, AND METHOD FOR GEOGRAPHIC POSITIONING OF MARINE FAUNA

[76] Inventor: Sigmar Gudbjornsson, Valhusabraut 29, IS-170 Seltjarnarnes, Iceland

[21] Appl. No.: 09/255,853

[22] Filed: Feb. 23, 1999

[30] Foreign Application Priority Data

Feb. 23, 1998 [IS] Iceland ............................. 4674

[51] Int. Cl.⁷ ................................................. H04B 1/59
[52] U.S. Cl. ........................................................ 367/6
[58] Field of Search ................... 367/2, 3, 5, 6, 367/118, 128

[56] References Cited

U.S. PATENT DOCUMENTS

| 5,119,341 | 6/1992 | Youngberg | 367/5 |
| 5,168,473 | 12/1992 | Parra | 367/124 |
| 5,331,602 | 7/1994 | McLaren | 367/6 |
| 5,408,238 | 4/1995 | Smith | 342/357 |

FOREIGN PATENT DOCUMENTS

| 0 662 617 A2 | 7/1995 | European Pat. Off. . |
| 7-55911 | 3/1995 | Japan . |

OTHER PUBLICATIONS

I.C. Russell, et al., *A Telemetric Tracking System for High Resolution Monitoring of Fish Movements*, International Council for the Exploration of the Sea, C.M. 1990/M:19; pp. 1–7, Denmark.

A. Moore, et al., *A Technique for Tracking Atlantic Salmon (Salmor salar L.) Smolts Through Estuaries*, International Council for the Exploration of the Sea, C.M. 1990/M:18, pp. 1–5, Denmark.

*Primary Examiner*—Daniel T. Pihulic
*Attorney, Agent, or Firm*—Bacon & Thomas. PLLC

[57] ABSTRACT

A system, apparatus, and method for determining positions of underwater animals involves emplacement of an acoustic transponder on the animal and establishing communications with a transponder carried by a vessel whose position can be determined by receiving signals from an external source such as a GPS satellite in order to establish proximity of the animal to the vessel, the position of the vessel then being adopted as the position of the animal. Communications can be established either by communicating the position of the transceiver to the equipment on the animal for storage therein, or by communicating the identity of the animal to the vessel whose position has been determined for association with the position, and subsequent local storage on the vessel and/or communication to a central station.

53 Claims, 4 Drawing Sheets

SYSTEM, APPARATUS, AND METHOD FOR GEOGRAPHIC POSITIONING OF MARINE FAUNA

BACKGROUND OF THE INVENTION

1. Field of the Invention

This invention relates to the field of stock estimation of underwater resources by establishing the geographic positions of representative animals, and in particular to a method, system, and apparatus that utilizes the Global Positioning System (GPS) or a similar positioning system such as the Differential Global Positioning System (DGPS), the Global Navigation Satellite System (GNSS), the Russian Positioning Satellite System (GLO-NASS), and Long Range Navigation (LORAN), for establishing the position of animals underwater, and for storing the established positions together with identification indicia, and other information for later retrieval, and/or for communication with a central station.

The invention takes the approach of adopting the position of the reference vessel or buoy as the position of the animal, rather than attempting to establish the exact position of the animals in relation to a nearby reference vessel or buoy as in U.S. Pat. No. 5,331,602, thereby reducing the complexity of equipment necessary to establish position, while still providing advanced information storage, retrieval, and communications capabilities.

2. Description of Related Art

In order to better estimate the condition of underwater resources, including sea, ocean, and freshwater fauna, it is of vital importance to be able to register the position of selected animals, and thereby track migration and distribution patterns, particularly in relation to environmental conditions. The environmental conditions that influence an animal's migration patterns or behavior are important parameters in modeling and/or simulation of underwater resource, and study of the animal's reactions to these parameters is critical if future resource estimation is to be improved.

(i) Conventional Non-GPS Tracking Methods

The most common current method for tracking underwater fauna such as fish and other marine animals is simply to tag them with labels and with an identification number. The geographic position and the time of tagging are then compared with the position and time of recapture of the animal and recovery of the tag. This method has the disadvantage that it requires capture of the animal each time its position is to be determined, without providing any information concerning what has happened to the animal between tagging and recapture, or between successive captures.

A second method currently used to track animals underwater is to attach a sonic activator to the animal. A ship with the necessary listening and receiving equipment follows the animal in order to register its trail. This method is expensive and it is only possible to follow one or a very few animals at once for a short period. Once the animal moves outside the range of the acoustic receiver, it is lost.

A third method is to tag animals with sonic activators or hydro-acoustic sound sources hermetically sealed in a tube that work at different frequencies, as disclosed in Russian Patent Publication No. SU-1316613. The tube simultaneously transmits underwater from the two sound sources to establish the direction and position of the animal relative to the measuring equipment, simplifying tracking, but the use of acoustic positioning limits the method to a limited geographic area, depending on the amount of transmitter output power that can be generated by equipment placed on or inside the animal.

In an article introduced at a conference in Copenhagen on Oct. 4–12, 1990, the Council Meeting of the International for the Exploration of the Sea describes a fourth tracking method that utilizes an acoustic sound source tag which is placed on an animal, and three sonar buoys placed on known coordinates around the area. Again, the range of this method is limited by the use of acoustic tracking and the requirement that the buoys be fixed.

A fifth method is to tag the animal with electronic data storage tags of the type that the present applicant for patent has developed and manufactures. The tags measure environmental parameters such as temperature, depth, and salinity, and from these environmental parameters a position can be estimated. By comparing those parameters to which the animal is exposed with known data from the environment, a position can be estimated for a relatively large geographic area. In addition, by adding measurements of light to which the tag has been exposed, it is possible to estimate the time for the sun's maximum height, and thereby narrow the area in which the animal was located. This method still has rather large uncertainties, however, and can only be used with reasonable precision on an animal that stays close to the surface in areas where there is a marked difference between day and night light intensity. As result, the method is not feasible in Nordic regions where there is light for most of the day in summer, and darkness for most of the day in winter.

A sixth conventional geographic positioning method involves so-called pop-up tags, which are tags that loosen from the tagged animal and then float to the surface. When the tag detects that it has reached the surface, it transmits the radio signals to, for example, a satellite, airplane, ship, or land, which determines the position of the tag. The tag can also transmit stored data to the satellite or other receiver, and thus can be used to provide a geographic position at the point where it surfaces. However, there is a significant uncertainty as to how long it takes the tag to make contact with the tracking vehicle after the tag reaches the surface, and tags of this type are large in size, heavy, and are therefore only suitable to be carried by large animals, limiting the method to relatively large fish species. In addition, the method can only be used to measure a single position, which is the position of the tag after reaching the surface, and thus cannot be used for detailed tracking.

(ii) Prior Use of GPS for Underwater Tracking

The present invention avoids the problems of the above-described conventional methods by using a positioning establishing system such as GPS in conjunction with sonar or similar acoustic transponders to establish underwater positions. The use of GPS transceivers and sonar communications to establish underwater positions is also known from U.S. Pat. No. 5,331,602, but the present invention differs from the method disclosed in U.S. Pat. No. 5,331,602 because it does not use sonar communications to establish position relative to the GPS transceivers, but rather uses the sonar communications to either: (A) establish the identity of a passing animal so that the identity information can be associated with a position, and/or (B) communicate position information to the passing animal, without attempting to establish a precise relative position between the animal and the GPS transceiver.

More significantly, U.S. Pat. No. 5,331,602 discloses a method of establishing the position of underwater objects or persons in which the GPS transceivers are used to establish the positions of at least a pair of buoys arranged to interrogate a transponder on the object or person using sonar. The precise position of the object or person relative to the pair of buoys can then be established by analyzing propagation delays in the communications between the two transceivers and between the transponder and respective transceivers.

While the system described in U.S. Pat. No. 5,331,602 is useful for missions where cost is not object or exact positioning is critical, such as military exercises, it is less practical for tracking underwater animals whose movements are less predictable, and which therefore require relatively large numbers of positioning stations spread over a large area. In the present invention, only a single buoy or other vessel equipped with a GPS transceiver is necessary to establish communication, and it is not necessary to process the underwater transmissions for positioning purposes, but only to receive previously determined position or identification information.

The present invention shares the concept of establishing the position of a buoy, and using sonar to communicate with a transponder on the object being tracked, and in particular an animal, but does not use analysis of propagation delays or any sort of triangulation method to establish the exact position of the animal relative to the buoy. Instead, it is sufficient to establish that a particular animal is in the vicinity of the buoy, the position of the buoy being adopted as the position of the animal. The sonar or acoustic communications between the buoy and the animal establish the presence of the animal near the buoy rather than the position of the animal, resulting in a tracking system that can utilize elements of the system of U.S. Pat. No. 5,331,602, but that is significantly simpler and more practical to implement, at least for the purpose of tracking underwater fauna.

Unlike the system of U.S. Pat. No. 5,331,602, the present invention also provides for storage of the position of a particular animal as well as data concerning environmental conditions, either in a memory situated in a tag on the animal itself, in a memory associated with the buoy, or in a memory at a central location, so that movements of the animal can be tracked and analyzed in relation to the environmental conditions. Thus, despite the simplicity of the positioning system of the invention, it provides significant improvements relative to prior underwater animal tracking methods, systems, and apparatus.

SUMMARY OF THE INVENTION

It is accordingly an objective of the invention to provide a method, system, and apparatus for establishing the position of underwater animals with sufficient precision to enable tracking and behavior analysis while still being relatively low in cost and practical to implement.

It is a further objective of the invention to provide a positioning method, system, and apparatus for underwater animals capable of establishing the position of animals at multiple times and in widely spaced geographic areas.

It is a further objective of the invention to provide a positioning system for underwater animals that uses identification tags that can be fitted on a variety of different types of underwater animals, including relatively small species and young animals, and that not only associates a particular identification tag with established positions, but is capable of recording additional parameters such as environmental conditions.

It is a further objective of the invention to provide a positioning system for underwater animals that enables the animals to be continuously tracked either from a central station or locally for later retrieval and analysis.

These objectives are achieved, in accordance with the principles of the invention, by providing a system, apparatus, and method for determining the positions of underwater animals, in which equipment placed on the animal communicates with a transponder associated with a position-determining transceiver in order to establish proximity of the animal to the transceiver, the position of the transceiver being adopted as the position of the animal either by communicating the position of the transceiver to the equipment on the animal for storage therein, or by communicating the identity of the animal for association with a position and storage in the vessel or buoy that carries the transceiver, and/or further transmission to a base or central station.

According to an especially preferred embodiment of the invention, the equipment or tag placed on the animal includes sensors for measuring environmental parameters for association and storage together with location and time data, so that behavior of the animal can be studied with respect to the stored parameters, storage being carried out either locally in the tag, in the vessel carrying the position determining transceiver to which the data is transmitted, or at a central station to which the data is broadcast. The transponder associated with the tag is preferably a hydroacoustic transducer such as a piezo-electric element, which conveniently forms part of the housing for the tag.

DETAILED DESCRIPTION OF THE PREFERRED EMBODIMENTS

The invention involves a system, apparatus, and method for determining the positions of underwater animals, in which equipment placed on the animal communicates with a transponder associated with a position-determining transceiver in order to establish proximity of the animal to the transceiver, the position of the transceiver being adopted as the position of the animal either by communicating the position of the transceiver to the equipment on the animal for storage therein, or by communicating the identity of the animal for association with a position and storage in the vessel or buoy that carries the transceiver, and/or further transmission to a base or central station. Initially, in section (1) a preferred embodiment of the system and apparatus of the preferred embodiment will be described in connection with FIGS. 1–6, after which in section (2) two methods of using the preferred system and method are described in connection with FIGS. 7 and 8.

1. System and Apparatus

Figure 1:
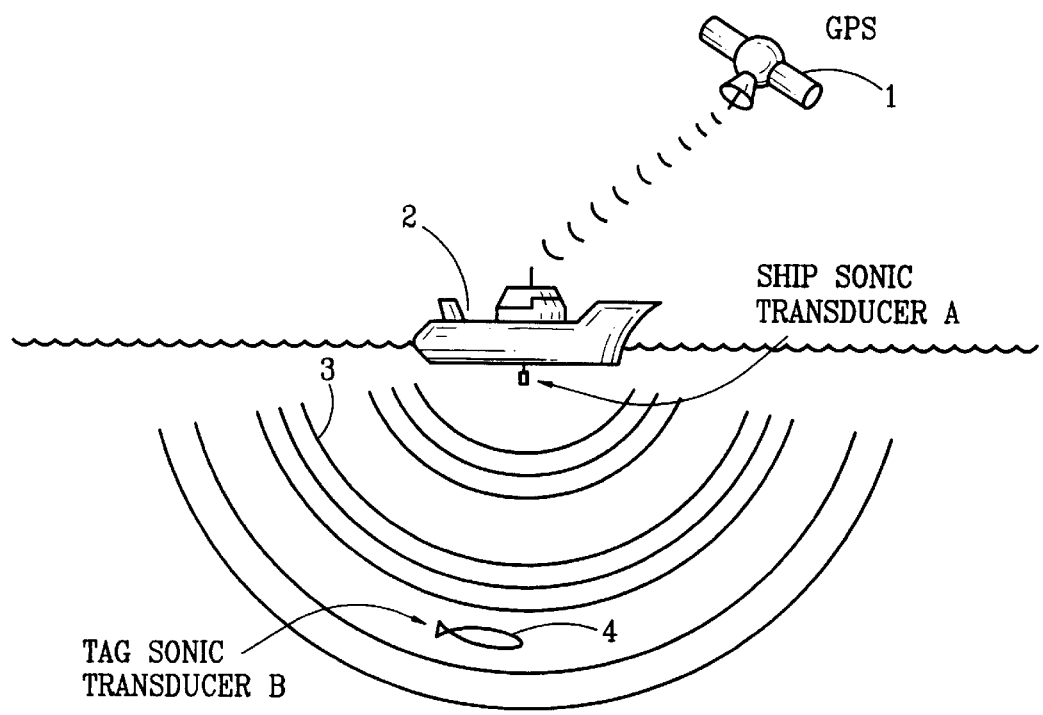
FIG. 1 is a schematic view of the principal components of a positioning system constructed in accordance with the principles of a preferred embodiment of the invention.
Figure 2:
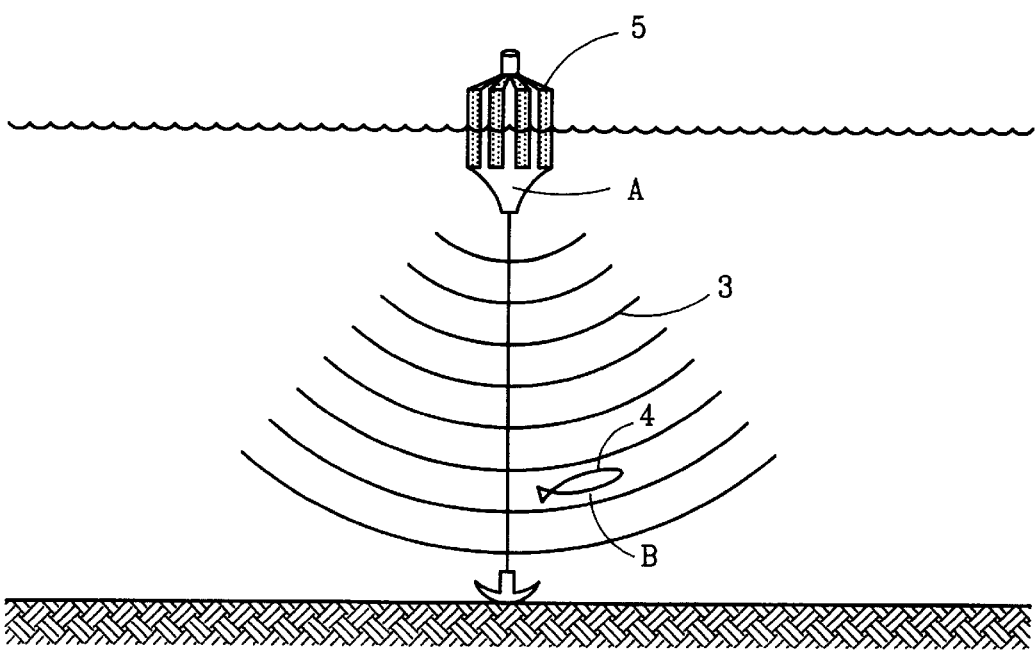
FIG. 2 is a schematic view of a variation of the positioning system of FIG. 1, in which the ship of FIG. 1 is replaced by a buoy.

FIGS. 1 and 2 schematically illustrate the principal components of a preferred system for determining positions of underwater fauna in accordance with the principles of a preferred embodiment of the invention, including a sonic transceiver 2 or transponder A capable of receiving and decoding positioning signals from a remote source 1, such as a satellite, and of emitting and receiving sonar communications 3 through the water. A transceiver or transponder B attached to an animal 4 and capable of communicating with transceiver A by sonar or other acoustic transmissions.

The basic principle of the invention is to associate particular tags with a geographic position, but instead of determining the exact position of the tag relative to an object whose position can be exactly determined, the position of the object whose position can be exactly determined is taken to be the position of the tag when the tag is sufficiently close to the object to establish acoustic underwater communications. In the case of the preferred embodiment of FIGS. 1 and 2, this is accomplished as illustrated in FIG. 1 by positioning transceiver A either on a ship 2, which may include fishing, research, coastguard, freight, or navy vessels of all types, or as illustrated in FIG. 2 by positioning the transceiver A on a buoy 5 that has a fixed position or that is allowed to drift. Alternatively, transceiver A may be positioned at the bottom of a body of water, in a submarine, or even on a portable land-based device set up on the shore of a lake or river.

Associated with sonic transceiver A is a position-determining device including a receiver capable of receiving arbitrary signal frames from any of a variety of geographic positioning systems currently available, including the Global Positioning System (GPS), the Differential Global Positioning System (DGPS), the Global Navigation Satellite System (GNSS), the Russian Positioning Satellite System (GLO-NASS), or Long Range Navigation (LORAN), as well as decoder circuitry capable of determining a geographic position based on the received arbitrary signal frames. The position-determining device may either be a separate unit, integrated with transceiver A, or part of a navigation system of the vessel on which transceiver A is located.

Those skilled in the art will understand that in addition to the above-mentioned currently available navigation systems, the principles of the invention may also be applicable to proposed navigation augmentation systems such as the wide-area augmentation system (WAAS), the multi-function transport satellite (MTSAT), and the European Geostationary Navigation Overlay Service (EGNOS).

As will be discussed in more detail below, transceiver A can be arranged to either transmit the position information to transceiver B for storage in a memory associated with transceiver B, interrogate transceiver B to obtain the identification number and, optionally, other information from transceiver B in order to associate the position information with the identification number and a time of contact for local storage or communication to a base station.

In general, the system and apparatus illustrated in FIGS. 1 and 2 use established technologies to implement the principles of the invention. GPS and other positioning determining systems are well-known and commercially available. Acoustic transponders that may mounted on the vessel and arranged to transmit position data are also available, modulation of the acoustic signals with the position data being a matter of routine software programming using, for example, a standard computer connected to the GPS transceiver and the acoustic transponder, although it is also within the scope of the invention to use modified or custom designed position determining transceivers and transponders. An example of an application combining a satellite-based positioning determining system and a sonic transceiver is disclosed in U.S. Pat. No. 5,331,602, incorporated herein by reference.

As indicated above, suitable programmable tags are available from Stjornu-Oddi (translated into English as "Star-Oddi") of Reykjavid, Iceland, and hydroacoustic transducers of appropriate frequency and size are available from other sources for utilization in the Star-Oddi tag. Modification of the currently available tags involves (i) design or modification of the programmable controller chip to receive, store, and transmit position and/or identification data as described in more detail below, (ii) addition of a hydroacoustic transducer for the purposes described in more detail below and, as necessary, miniaturization of the tag for use on a wider variety of animals. All of these modifications are well within the capabilities of the ordinary artisan based on the descriptions presented below and the accompanying drawings.

Figure 3:
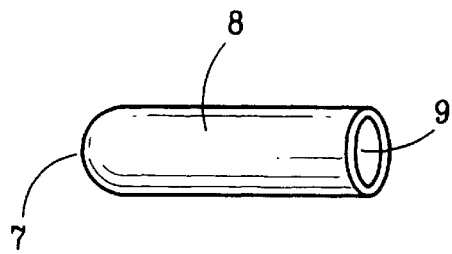
FIG. 3 is a isometric representation of a tag for use with the positioning system illustrated in FIGS. 1 and 2.
Figure 4:
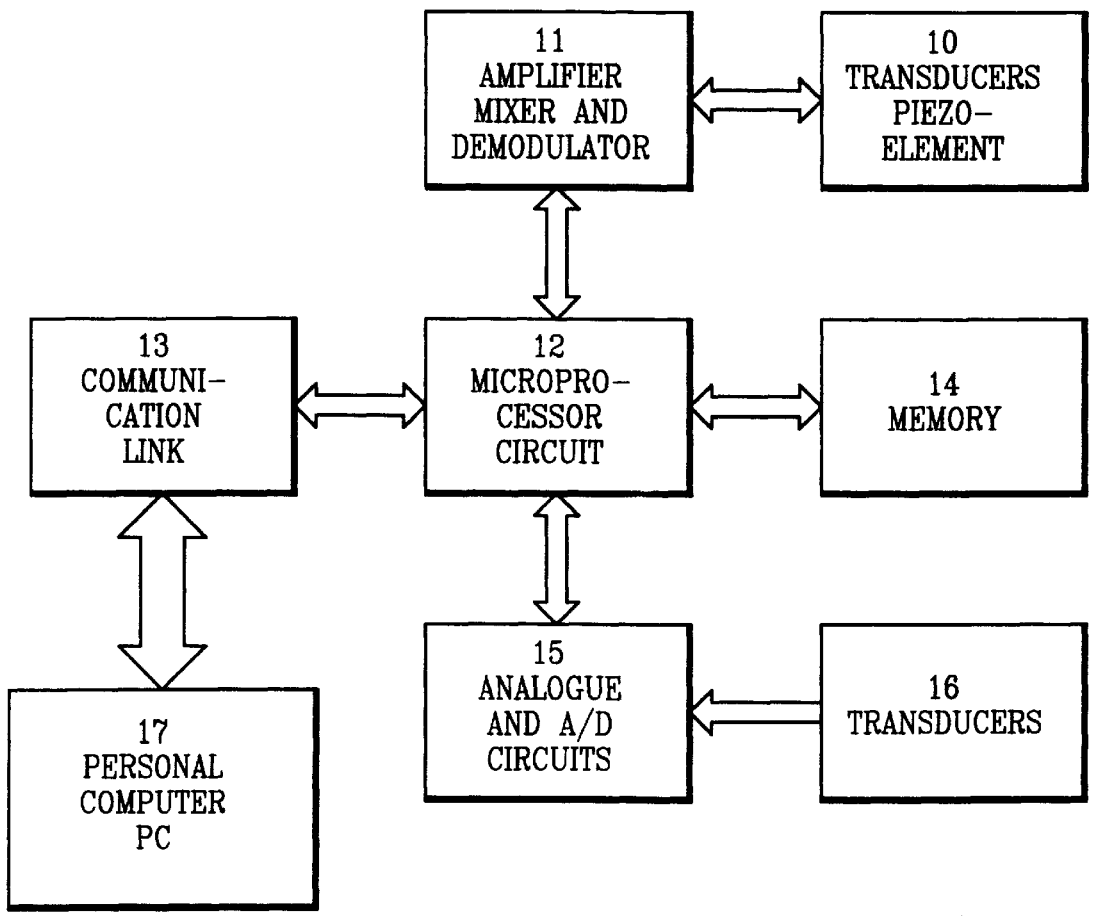
FIG. 4 is a block diagram illustrating elements of the positioning system illustrated in FIGS. 1 and 2.

By way of example, the Star-Oddi tag model DST300 can be modified, as illustrated in FIG. 3, such that at least a part of the housing 7 forms a piezo-electric ceramic element that serves as the sonic transceiver, with part 8 of the housing containing a battery and the electronic circuitry illustrated in more detail in FIG. 4, including sensors or transducers 16, analog and analog-to-digital conversion circuitry 15, the piezo-electric element 10, amplifier, mixer, and demodulator circuitry 11, a microprocessor 12, and a memory 14 arranged to store received and collected data and software for retrieving data from the sensors and/or acoustic transmissions, and/or for modulating stored data for transmission by the hydroacoustic transducer, and sensors. The housing is arranged to withstand high pressures and hermetically sealed together with a ceramic pressure sensor 9 that permits connection of external sensors to the sonic transceiver equipment.

A sonic transceiver thus constructed, including integrated sensors that measure both physical and physiological parameters, has a diameter of 13 mm or less and a length of 35 mm or less, forming a package that weighs only a few grams. In an even smaller version with a more limited number of measured parameters, the sonic transceiver equipment can be housed with a diameter of 9 mm or less, and a length of 25 mm or less, with a substantial reduction in weight. This means that the smaller and younger animals of a species that are currently being researched can be tagged, as well as species that are too small for previously types of tags.

While the tag is receiving geographic position data from transceiver A, it can still be able to make other measurements. In addition, the tag can make measurements at times other than when it is in proximity of transceiver A. Examples of other parameters that may be measured by the additional sensors and that are useful for analyzing animal behavior include environmental temperature, the animal's temperature, depth, salinity, tilt angle in one, two, or three directions, compass/direction, geomagnetic field strength, light intensity, registration of environmental noise, heart rate, blood pressure, and physical movements such as "tail beat", animal hormones and pheromones, and the animal's own generated sounds and breathing frequency. The invention thus makes it possible, in a simple and economic fashion, to record both large and small animal's migration routes underwater, and the routes to other behaviors. Such information is extremely important when determining fisheries' quotas and controlling catches.

The piezo-electric elements 10 illustrated in FIG. 4 preferably can receive sonic signals within the frequency range of 10 KHz to 200 KHz. Those skilled in the art will appreciate, however, that any transducer that reacts to pressure wave with a given change in electrical parameters such as capacitance, resistance, frequency, crystal resonance frequency, and so forth, may be substituted for the illustrated piezo-electric elements, as may piezo-electric elements and other types of transducers that have an extended frequency range or a range that includes frequencies that are lower or higher than 10 KHz to 200 KHz. The sonic transceiver equipment B receives signals from the sonic transceiver A, demodulates the received signal and reads it directly from the receiving frequency, or from a lower frequency when the received signal has been transferred to a lower frequency by mixer 11.

As illustrated, the tag is microprocessor controlled, with appropriate software for the microprocessor 12 being programmed into a memory, which may be in the form of a memory built into the processor or may be included in memory 14, which also serves to store positions and measured data. To carry out the functions of the preferred system, any low-energy microprocessor with appropriate integrated standard functions may be used. A number of manufacturers currently offer microprocessors with the requisite size and capabilities, including the ability enter a sleep-mode during periods when no data is being input from either the hydroacoustic transponder or the sensors. Among the functions that can be routinely programmed by the skilled artisan are the parameters that should be sampled, the number of samples to be taken with a given period, and the number of sampling periods.

When the tag is designed to store geographical position data received from transceiver A, or even just designed to broadcast identity and sensor data to transceiver A for storage on a ship or buoy, the received positions and/or measured parameters are stored in the memory 14, which may consist of a RAM or EEPROM, or any other suitable storage medium. EEPROMs are preferred because an EEPROM will hold data even after the battery or power source for the tag is depleted. Whether or not an EEPROM is used, however, the battery should be capable of functioning for at least a year, since marine life cycles or migration patterns normally cover the entire year.

Figure 5:
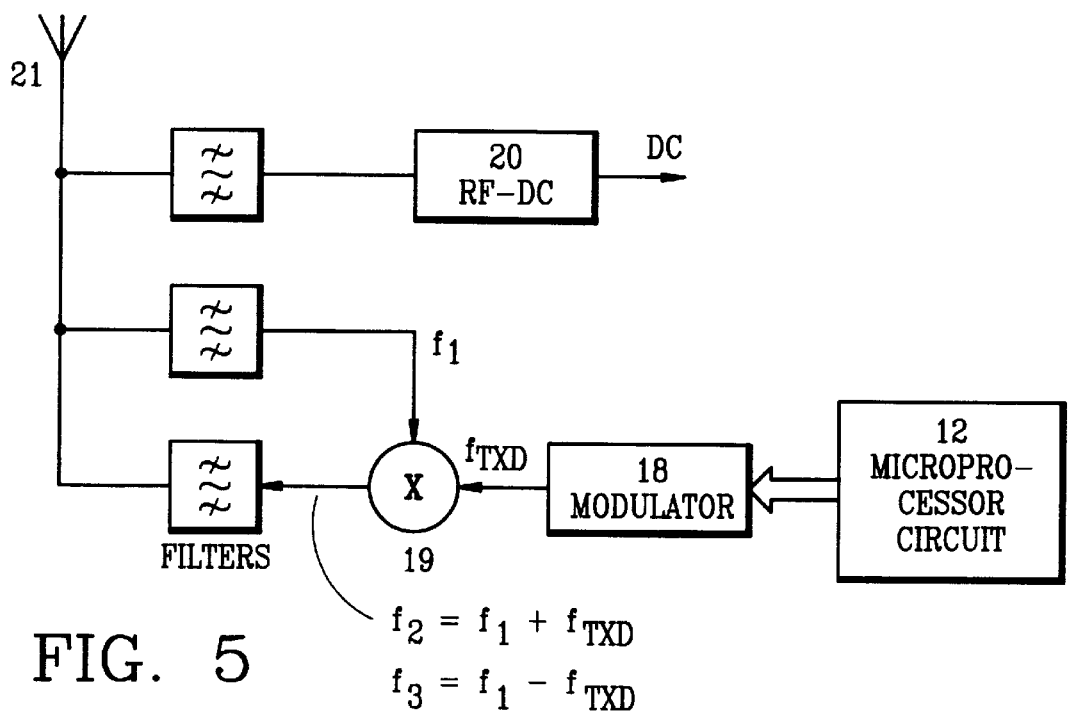
FIG. 5 is a schematic diagram of an arrangement for retrieving data from a tag of the type suitable for use in the positioning system of the preferred embodiment of the invention.

Upon recovery of the tag or sonic transceiver B, either by capture of the animal of separation of the tag from the animal (separation may occur either as a result of natural causes or at a preprogrammed time), the data is transferred from the memory to, for example, a personal computer 17 for further processing, as illustrated in FIG. 4. Data transfer may be achieved by a hard-wired or wireless communications link 13, with power preferably being supplied to the tag either through the hard-wired connection or, in the case of a wireless connection, by generation of power in the tag using application of high frequency energy 20 (1 HMz to 2 GHz) to activate the transmitter, thereby saving battery current to extend the lifetime of the tag, and enabling communications with a tag that has been in the field for an extended period and has no battery life left. As illustrated in FIG. 5, for example, upon placement of the tag in a fixture which exposes the tag to high frequency energy, and a resulting generation of DC current 20 in the sonic transceiver to power up the equipment for communication, modulator 18 modulates an internally generated high frequency signal with data from microprocessor 12 and mixes it with the exposed frequency from the fixture for transmission back to the fixture via an antenna 21. As those skilled in the art will appreciate, the generated high frequency signal could have a range of anywhere from a few KHz to hundreds of KHz or higher.

By way of example, a currently available sonar device placed on a ship and a hydroacoustic receiver of the type described above that has been placed 50 meters from the bottom in the North Atlantic and operating at a frequency of 24 kHz at a sound level of 205 dB/1 $\mu$Pa in spherical form will have an echo level or signal strength of 85 dB at a range of 10 Km, depending on the absorption coefficient of the water at the specified frequency, which depends on environmental conditions such as temperature, salinity, ph and pressure. The 85 dB level is just sufficient to separate the acoustic transmission from the noise floor at the 50 feet level. For animals that swim further from the bottom, a lower signal level is possible to achieve the same range, and the range can easily be lowered by simply decreasing the sensitivity of the receiver or decreasing the signal level of the output in order to achieve more precise positioning of the animal when using sonar to transmit acoustic signals that are modulated with position information into the water at a selected frequency during normal operation.

2. Method

The method of the invention includes several embodiments, all designed to determine whether an animal is in proximity to a vessel such as a ship or buoy whose position can be accurately determined, and to associated the animal with the position, as follows:

(i) Sound Source Transmits Geographical Position

Figure 7:
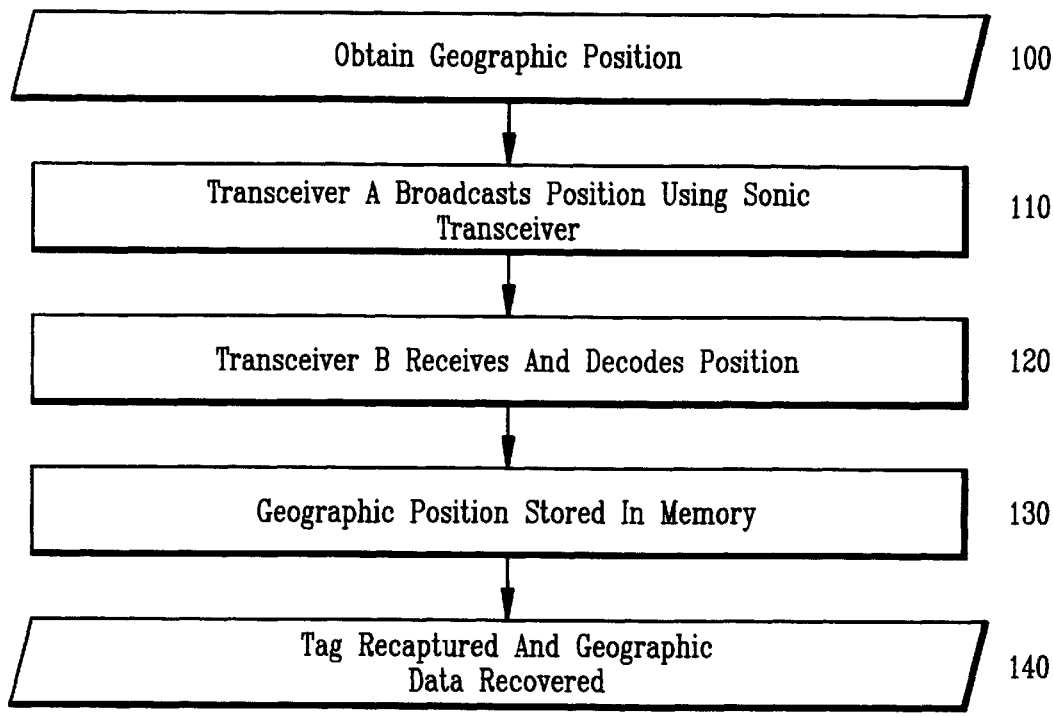
FIG. 7 is a flowchart illustrating a position determining method according to a preferred embodiment of the invention.

In this embodiment, illustrated in FIG. 7, a satellite receiving unit on board a vessel such as a ship or a buoy obtains its geographic position (step 100) and broadcasts the position using the sonic transceiver (step 110). Preferably, the acoustic or sonic signals containing the geographic position are transmitted in a sequence that has a built-in delay between successive bits that allows reflection from a previously transmitted bit to fade out before interfering with later bits in the sequence.

If an animal carrying transceiver B is within range of the acoustic signals from transceiver A, transceiver B receives and decodes the signals (step 120) to determine whether it contains messages and/or the geographical position. The received geographical position is then stored in the equipment's memory (step 130) and associated with a time of receipt (either based on an internal clock or included in the received transmission) and/or environmental or physiological data from sensors in the tag for later retrieval (step 140).

(ii) Transceiver A Receives Identification Information

Figure 8:
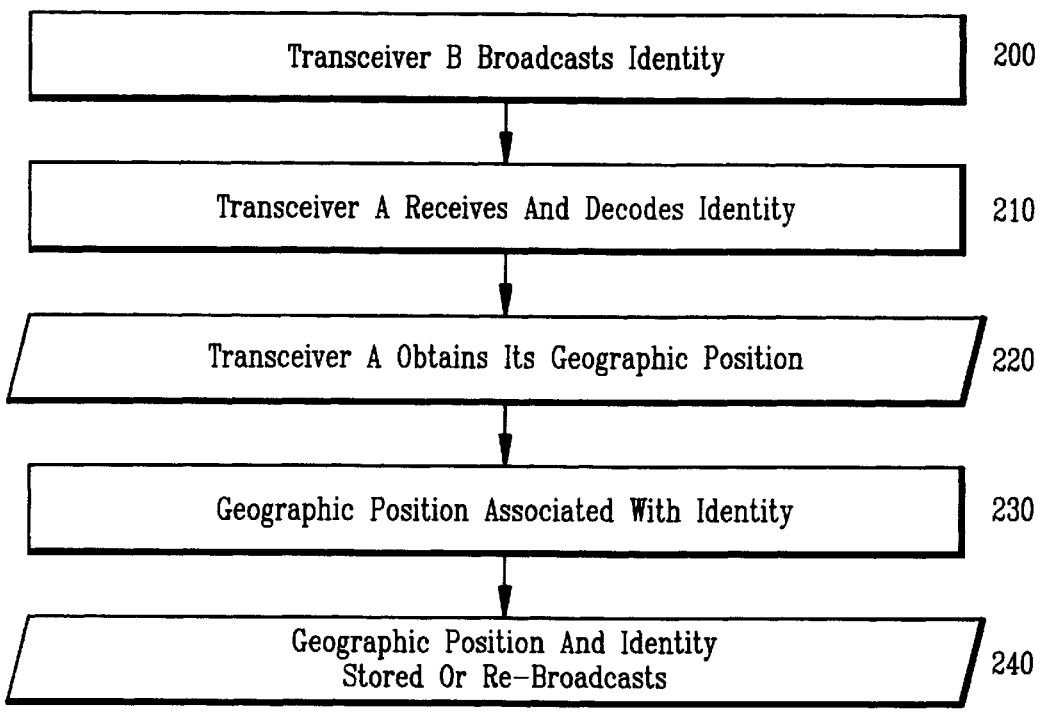
FIG. 8 is a flowchart illustrating an alternative position determining method according to another preferred embodiment of the invention.

In this embodiment, illustrated in FIG. 8, when an animal with an appropriately arranged transceiver B comes within range of transceiver A, acoustic signals broadcast by transceiver B, either periodically or in response to a broadcast query from transceiver A, are received and decoded by transceiver A in order to obtain an identification number of the tag that includes transceiver B (steps 200 and 210). Transceiver A then obtains its geographic position using a GPS receiver or the like (step 220), associates the identification number and geographic position together with related information such as the time and data (step 230), transmits the identification number, geographic position, and other information through a modem to a central tracking station, and/or stores the identification number, geographic position, and other information in an appropriate storage medium such as a tape, magnetic disk, or optical disc (step 240).

(iii) Two-Way Communication

In addition to the embodiments in which transceiver B receives the geographic position from transceiver A for local storage, and transceiver A receives the identification information from transceiver B for local storage or re-transmission, it is possible for transceiver B to respond to receipt of geographic information by transmitting the identification number of the tag, or for transceiver A to respond to receipt of an identification number by transmitting the geographic position, so that storage of position can be carried out by both the tag and the transceiver A.

(iv) Sleep Mode and Multiple Measurements

Preferably, for the embodiment in which the transceiver B receives geographical data from transceiver A, or in case the transceiver B is arranged to respond to a broadcast query from transceiver A, when the microprocessor has verified reception of a geographical position or query from transceiver A, it can be programmed to put itself into a low current consumption state or "sleep mode" for a predetermined amount of time so as to avoid storing repeated transmissions of the same geographical data.

Figure 6:
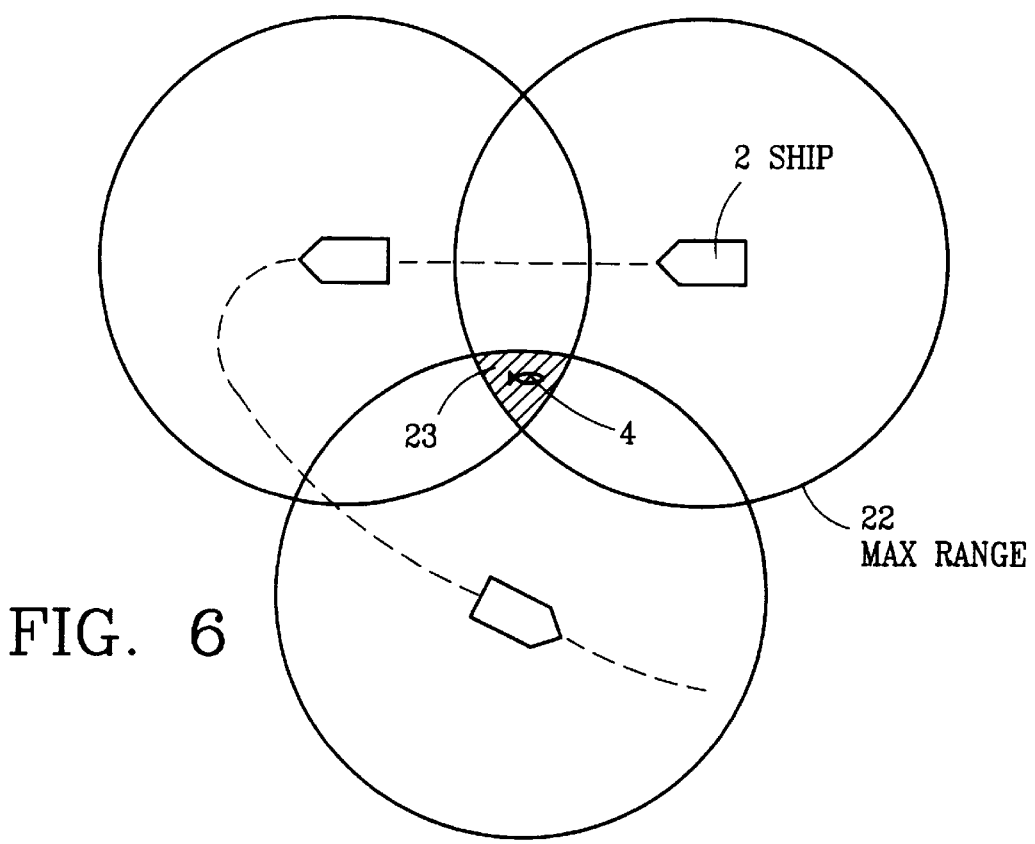
FIG. 6 is a schematic diagram illustrating a situation in which successive attempts at communication from a moving vessel may be used to more precisely establish the position of an animal.

On the other hand, if transceiver A receives transmissions from transceiver B, either in response to receipt of geographic data or in order to establish identity, and transceiver A is on a ship that is travelling faster than the animal carrying transceiver B, the ship can vary its path upon identification of a tag, as illustrated in FIG. 6, in order to more precisely measure the animal's position 23 by attempting to establish communications at several points along a path to determine whether the animal is still within the maximum range 22 of the ship's sonic transceiver. This method can also be used if transceiver B simply comes within range of a moving ship that is broadcasting its position, the multiple positions being stored in the tag so as to enable the possible location of transceiver B relative to the moving ship upon recovery of the stored position data.

Alternatively, or in addition, when transceiver B receives an acoustic signal from transceiver A, the received signal strength can be used to give an indication of the distance between transceiver A and G based on the amplitude of the acoustic signal detected by the receiver or analog-to-digital circuitry in transceiver B. This indication can then be stored together with the position information received from transceiver A. Still further, transceiver A could transmit acoustically to the tag together with the position information concerning the strength of the signal output by transceiver A, i.e., information on the acoustic power output, which information could also be stored with the geographic position information and the indication of signal strength to enable the relative positions of transceiver A and B to be more precisely determined upon recovery of the information.

(v) Programming and Placement of the Tag

Sonic transceiver B is customer specified in regard to its programmed performance such as start time, sampling time, number of samplings in a particular period, number of sampling periods, listening times, waiting times, and so forth. Researchers and scientists receive the sonic transceiver equipment and program it to work in a specific manner in relation to the research that is being performed. For example, programming by the user may be carried out by a wireless link, which may also be used to retrieve information from the tag upon recapture of the tagged animal.

The animal is tagged with the registration equipment by fastening the equipment externally, by sewing, gluing, or fastening with wire, or by surgical implantation in the animal by, for example, making a small hole in the animal's body cavity into which the sonic transceiver equipment is pushed, or into flesh or muscle, and the hole is sewed closed or glued back. No specific treatment is necessary if the hole is small enough.

Having thus described a preferred embodiment of the invention with sufficient particularity to enable those skilled in the art to easily make and use the invention, and having described several possible variations and modifications of the preferred embodiment, it should nevertheless be appreciated that still further variations and modifications of the invention are possible, and that all such variations and modifications should be considered to be within the scope of the invention. For example, although particularly useful for tracking underwater or aquatic fauna using tags on the animals and ships or buoys, the invention may possibly be used for tracking other aquatic objects from platforms other than ships of buoys. In addition, the position of the platform to obtains the geographic position data may be determined by systems other than the above described navigation or positioning systems. Accordingly, the scope of the invention should not be limited by the above description, but rather should be interpreted solely in accordance with the appended claims.

I claim:

1. A system for determining a position of an object that is underwater, comprising:
    a device situated on a first object for receiving and decoding positioning signals transmitted from an external source in order to determine a position of the first object;
    a first acoustic transponder situated on the first object;
    a second acoustic transponder secured to a second object whose position is to be determined,
    wherein the position of the second object is assumed to be the position of the first object when said second object is sufficiently close to the first object that communications sent by one of said first and second transponders is received by the other of said first and second transponders,
    wherein the assumed position is stored in a memory on at least the other of said first and second objects; and
    further comprising additional objects having additional transponders situated out of range of the first transponder, said additional transponders including additional devices for receiving and decoding positioning signals transmitted from an external source, wherein when said second transponder passes sufficiently close to one of said additional transponders such that communications sent by one of said additional and second transponders is received by the other of said additional and second transponders, said position of said additional transponder is assumed to be the position of the second object and said position is stored in said memory, thereby enabling the second object to be tracked as it passes by said first object and any of said additional objects.

2. A system as claimed in claim 1, wherein said second object is an aquatic animal.

3. A system as claimed in claim 1, wherein said first object is a ship.

4. A system as claimed in claim 1, wherein said first object is a buoy.

5. A system as claimed in claim 1, wherein said second object is an aquatic animal, said memory is included in a tag secured to the aquatic animal, and said one of said first and second transponders that receives said communication is also secured to the tag, said communication including data concerning the position of the first object, which is stored in said memory.

6. A system as claimed in claim 1, wherein said second object is an aquatic animal, said memory is situated on said first object, and said one of said first and second transponders that receives said communication is said first transponder situated on the first object, wherein said communication includes identification data sent by the second transponder to the first transponder, said identification data being stored in said memory together with data concerning the position of the first object.

7. A system as claimed in claim 6, further comprising means for transmitting said identification data and position data to a base station.

8. A system as claimed in claim 1, wherein said second object is an aquatic animal and said communication further includes data concerning environmental conditions to which the aquatic animal is subject, said environmental condition data being stored together with the identification data and position data so as to provide information concerning a reaction of the aquatic animal to environmental conditions.

9. A system as claimed in claim 1, wherein said second object is an aquatic animal and further comprising a sensor secured to a tag on the aquatic animal for gathering environmental data, said environmental data being stored in said memory together with data concerning said position so as to provide information concerning a reaction of the aquatic animal to environmental conditions.

10. A system as claimed in claim 1, wherein said device is arranged to receive and decode positioning signals from a satellite positioning system.

11. A system as claimed in claim 10, wherein said device is a Global Positioning System (GPS) receiver.

12. A system as claimed in claim 1, wherein said second object is an aquatic animal and said second transponder includes a hydroacoustic transducer.

13. A system as claimed in claim 12, wherein said hydroacoustic transducer forms at least part of a housing of a tag secured to the aquatic animal.

14. A system as claimed in claim 13, wherein said tag includes a memory for storing data concerning said position of the first object received by said hydroacoustic transducer.

15. A system as claimed in claim 14, wherein said tag further includes at least one sensor for gathering data concerning an environmental condition to which the aquatic animal is subject, and for storing said environmental condition data together with said position data.

16. A system as claimed in claim 14, wherein said tag is arranged to receive high frequency energy from a fixture upon recovery of the tag, and to mix an internally generated high frequency signal that has been modulated with data stored in the memory for transmission back to the fixture in order to recover the data while saving internal battery power so that the tag can be re-used.

17. A system as claimed in claim 1, wherein said second object is an aquatic animal and said first object is a relatively fast moving vessel, and said communications repeated at different positions of said vessel in order to more precisely establish a position of the aquatic animal relative to the vessel.

18. A system as claimed in claim 1, wherein said second object is an aquatic animal, the transponder on the second object is a hydroacoustic transducer, and further comprising means for measuring a received signal strength of said communications, said communications including information concerning said geographic position of the first object, and means for storing data in said memory concerning the received signal strength together with said geographic position of the first object.

19. A system as claimed in claim 18, wherein said communications further include information concerning an acoustic power output of the transponder on the first object, and wherein said means for storing the signal strength further comprises mean for storing the acoustic power output.

20. Apparatus for tracking aquatic objects moving underwater in an aquatic environment, comprising:
 a tag arranged to be secured to and to move with an aquatic object, which is the object to be tracked;
 a hydroacoustic transducer in said tag for communicating with a transponder located on a reference object when said aquatic object is sufficiently close to said reference object that communications can be carried out between said aquatic object and said reference object, and reference object including a device for determining a position of the reference object; and
 a memory situated on one of said reference object and said aquatic object for at least storing data concerning the position of the reference object when the aquatic object is sufficiently close the reference object that said communications can be carried out.

21. Apparatus as claimed in claim 20, wherein said aquatic object is an aquatic animal.

22. Apparatus as claimed in claim 20, wherein said reference object is a ship.

23. Apparatus as claimed in claim 20, wherein said reference object is a buoy.

24. Apparatus as claimed in claim 20, wherein said aquatic object is an aquatic animal, said memory is included in a tag secured to the aquatic animal, and said one of said first and second transponders that receives said communication is also secured to the tag, said communication including data concerning the position of the reference object, which is stored in said memory.

25. Apparatus as claimed in claim 20, wherein said aquatic object is an aquatic animal, said memory is situated on said reference object, and said one of said first and second transponders that receives said communication is said first transponder situated on the reference object, wherein said communication includes identification data sent by the second transponder to the first transponder, said identification data being stored in said memory together with data concerning the position of the reference object.

26. Apparatus as claimed in claim 25, further comprising means for transmitting said identification data and position data to a base station.

27. Apparatus as claimed in claim 20, wherein said aquatic object is an aquatic animal and said communication further includes data concerning environmental conditions to which the aquatic animal is subject, said environmental condition data being stored together with the identification data and position data so as to provide information concerning a reaction of the aquatic animal to environmental conditions.

28. Apparatus as claimed in claim 26, wherein said aquatic object is an aquatic animal and further comprising a sensor secured to a tag on the aquatic animal for gathering environmental data, said environmental data being stored in said memory together with data concerning said position so as to provide information concerning a reaction of the aquatic animal to environmental conditions.

29. Apparatus as claimed in claim 20, wherein said device is arranged to receive and decode positioning signals from a satellite positioning system.

30. Apparatus as claimed in claim 29, wherein said device is a Global Positioning System (GPS) receiver.

31. Apparatus as claimed in claim 20, wherein said aquatic object is an aquatic animal and said second transponder includes a hydroacoustic transducer.

32. Apparatus as claimed in claim 27, wherein said hydroacoustic transducer forms at least part of a housing of a tag secured to the aquatic animal.

33. Apparatus as claimed in claim 32, wherein said tag includes a memory for storing data concerning said position of the reference object received by said hydroacoustic transducer.

34. Apparatus as claimed in claim 33, wherein said tag further includes at least one sensor for gathering data concerning an environmental condition to which the aquatic animal is subject, and for storing said environmental condition data together with said position data.

35. Apparatus as claimed in claim 33, wherein said tag is arranged to receive high frequency energy from a fixture upon recovery of the tag, and to mix an internally generated high frequency signal that has been modulated with data stored in the memory for transmission back to the fixture in order to recover the data while saving internal battery power so that the tag can be re-used.

36. Apparatus as claimed in claim 20, wherein said second object is an aquatic animal and said first object is a relatively fast moving vessel, and wherein said communications are repeated at different positions of said vessel in order to more precisely establish a position of the aquatic animal relative to the vessel.

37. Apparatus as claimed in claim 20, wherein said second object is an aquatic animal, the transponder on the second object is a hydroacoustic transducer, and further comprising means for measuring a received signal strength of said communications, said communications including information concerning said geographic position of the first object, and means for storing data in said memory concerning the received signal strength together with said geographic position of the first object.

38. Apparatus as claimed in claim 37, wherein said communications further include information concerning an acoustic power output of the transponder on the first object, and wherein said means for storing the signal strength further comprises means for storing the acoustic power output.

39. A method of determining a position of an object that is underwater, comprising the steps of:

determining a geographic position of a first object;

establishing communications between a transponder on the first object and a transponder on a second object whose position is to be determined;

upon establishing said communications and thereby determining that the first object is within range of the second object, storing the geographic position of the first object in a memory associated with one of the first and second objects, whereby the geographic position of the first object is assumed to be the geographic position of the second object.

40. A method as claimed in claim 39, wherein said second object is an aquatic animal.

41. A method as claimed in claim 39, wherein said first object is a ship.

42. A method as claimed in claim 39, wherein said first object is a buoy.

43. A method as claimed in claim 39, wherein said second object is an aquatic animal, said memory is included in a tag secured to the aquatic animal, and said one of said first and second transponders that receives said communication is also secured to the tag, and wherein said step of establishing said communications includes the steps of transmitting data concerning the position of the first object to said second object and storing said data in said memory.

44. A method as claimed in claim 39, wherein said second object is an aquatic animal, said memory is situated on said first object, and said one of said first and second transponders that receives said communication is said first transponder situated on the first object, and wherein said step of establishing communications includes the steps of transmitting identification data from the second transponder to the first transponder and storing said identification data in said memory together with data concerning the position of the first object.

45. A method as claimed in claim 44, further comprising the step of transmitting said identification data and position data to a base station.

46. A method as claimed in claim 39, wherein said second object is an aquatic animal and said step of establishing communications further comprises the steps of transmitting data concerning environmental conditions to which the aquatic animal is subject and storing said environmental condition data being stored together with the identification data and position data so as to provide information concerning a reaction of the aquatic animal to environmental conditions.

47. A method as claimed in claim 39, wherein said second object is an aquatic animal and further comprising the steps of using a sensor secured to a tag on the aquatic animal for gathering environmental data, and storing said environmental data in said memory together with data concerning said position so as to provide information concerning a reaction of the aquatic animal to environmental conditions.

48. A method as claimed in claim 39, wherein the step of determining a position of said first object comprises the step of receiving and decoding positioning signals from a satellite positioning system.

49. A method as claimed in claim 48, wherein said step of receiving and decoding positioning signals from a satellite positioning system includes the step of receiving and decoding signals from a Global Positioning System satellite.

50. A method as claimed in claim 39, further comprising the steps of causing a microprocessor on the second object to enter a sleep mode for a predetermined period following the step of establishing said communications in order to prevent repeated storage of the same geographic data.

51. A method as claimed in claim 39, wherein said second object is an aquatic animal and said first object is a relatively fast moving vessel, and said step of establishing communications is repeated at different positions of said vessel in order to move precisely establish a position of the aquatic animal relative to the vessel.

52. A method as claimed in claim 39, wherein said second object is an aquatic animal, the transponder on the second object is a hydroacoustic transducer, and further comprising the step of (a) measuring a received signal strength of said communications from said first transponder to said second transponder, said communications including information concerning said geographic position of the first object, and (b) storing data concerning the received signal strength together with said geographic position of the first object.

53. A method as claimed in claim 52, further comprising the step of including in said communications information concerning an acoustic power output of the transponder on the first object, an the acoustic power output together with said received signal strength data.

\* \* \* \* \*